US010055093B2

(12) United States Patent
Shim

(10) Patent No.: US 10,055,093 B2
(45) Date of Patent: Aug. 21, 2018

(54) VEHICLES WITH NAVIGATION UNITS AND METHODS OF CONTROLLING THE VEHICLES USING THE NAVIGATION UNITS

(71) Applicant: Hyundai Motor Company, Seoul (KR)

(72) Inventor: Kyudae Shim, Seoul (KR)

(73) Assignee: Hyundai Motor Company, Seoul (KR)

( * ) Notice: Subject to any disclaimer, the term of this patent is extended or adjusted under 35 U.S.C. 154(b) by 277 days.

(21) Appl. No.: 14/854,355

(22) Filed: Sep. 15, 2015

(65) Prior Publication Data

US 2016/0077688 A1 Mar. 17, 2016

(30) Foreign Application Priority Data

Sep. 15, 2014 (KR) .......................... 10-2014-0121795

(51) Int. Cl.
| | |
|---|---|
| *G06F 3/048* | (2013.01) |
| *G06F 3/0482* | (2013.01) |
| *G06F 3/0484* | (2013.01) |
| *G01C 21/36* | (2006.01) |
| *B60K 35/00* | (2006.01) |
| *G01C 21/26* | (2006.01) |

(52) U.S. Cl.
CPC ............ *G06F 3/0482* (2013.01); *B60K 35/00* (2013.01); *G01C 21/265* (2013.01); *G01C 21/36* (2013.01); *G06F 3/04842* (2013.01); *G06F 3/04847* (2013.01); *B60K 2350/1004* (2013.01); *B60K 2350/1096* (2013.01)

(58) Field of Classification Search
CPC ... G06F 3/0482; G06F 3/04847; B60K 35/00; B60K 37/02; G01C 21/265; G01C 21/36

USPC ......................................................... 715/771
See application file for complete search history.

(56) References Cited

U.S. PATENT DOCUMENTS

| | | | |
|---|---|---|---|
| D722,613 S * | 2/2015 | Pearcy | ......................... D14/486 |
| 9,341,493 B2 * | 5/2016 | Lien | ................... G01C 21/3611 |
| 9,411,507 B2 * | 8/2016 | Moore | ..................... G06F 3/167 |
| 9,802,622 B2 * | 10/2017 | Park | ....................... B60W 50/08 |
| 2008/0278298 A1 | 11/2008 | Waeller et al. | |
| 2011/0082618 A1 * | 4/2011 | Small | ..................... B60K 35/00 701/31.4 |
| 2011/0082619 A1 * | 4/2011 | Small | ..................... B60K 35/00 701/31.4 |

(Continued)

FOREIGN PATENT DOCUMENTS

| | | |
|---|---|---|
| JP | 2006048283 A | 2/2006 |
| JP | 2007216711 A | 8/2007 |

(Continued)

OTHER PUBLICATIONS

Korean Office Action issued in Application No. 10-2014-0121795 including translation.

*Primary Examiner* — David Phantana-angkool
(74) *Attorney, Agent, or Firm* — Mintz Levin Cohn Ferris Glovsky and Popeo, P.C.; Peter F. Corless

(57) ABSTRACT

A vehicle has a navigation unit provided with a display unit displaying information related to the vehicle. The navigation unit detects whether a menu related function needing to be displayed on the display unit is present by analyzing a condition of the vehicle and a driving pattern. The navigation unit outputs the menu related function through the display unit when the menu related function is present.

23 Claims, 12 Drawing Sheets

(56) References Cited

U.S. PATENT DOCUMENTS

| | | | | |
|---|---|---|---|---|
| 2011/0082620 A1* | 4/2011 | Small | ............... | B60K 35/00 |
| | | | | 701/31.4 |
| 2013/0275924 A1* | 10/2013 | Weinberg | ............... | G06F 3/017 |
| | | | | 715/863 |
| 2014/0094151 A1* | 4/2014 | Klappert | ............ | H04M 1/6083 |
| | | | | 455/414.1 |
| 2015/0088422 A1* | 3/2015 | Nikovski | ............... | G01C 21/36 |
| | | | | 701/538 |
| 2015/0234636 A1* | 8/2015 | Barnes, Jr. | ............... | G06F 3/167 |
| | | | | 715/728 |
| 2015/0367861 A1* | 12/2015 | Mori | ............... | B60W 50/14 |
| | | | | 701/1 |
| 2016/0103567 A1* | 4/2016 | Wengelnik | ......... | G06F 3/04842 |
| | | | | 715/779 |

FOREIGN PATENT DOCUMENTS

| | | |
|---|---|---|
| JP | 2011081796 A | 4/2011 |
| KR | 10-0856491 | 9/2008 |
| KR | 10-2013-0140465 | 12/2013 |
| KR | 10-1339833 | 12/2013 |

* cited by examiner

FIG. 6
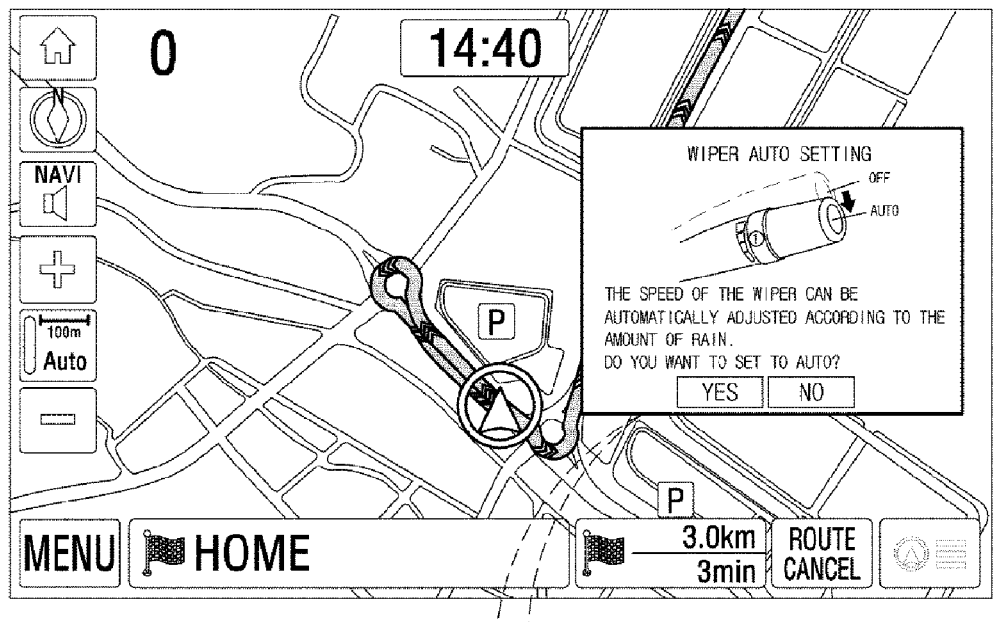
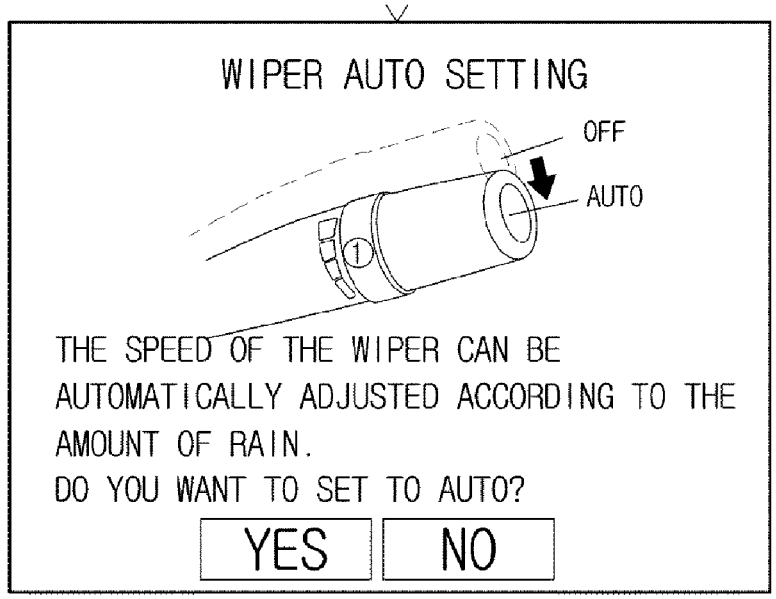

VEHICLES WITH NAVIGATION UNITS AND METHODS OF CONTROLLING THE VEHICLES USING THE NAVIGATION UNITS

CROSS-REFERENCE TO RELATED APPLICATION(S)

This application claims the benefit of Korean Patent Application No. 10-2014-00121795, filed on Sep. 15, 2014 in the Korean Intellectual Property Office, the disclosure of which is incorporated herein by reference.

BACKGROUND

1. Field

The present disclosure relates to vehicles with navigation units and methods of controlling such vehicles.

2. Description of Related Art

Various vehicle safety devices have been developed in consideration of user convenience and safety. More particularly, vehicle safety devices may include a lane departure warning system configured to prevent the vehicle from moving out of its lane on freeways and arterial roads by assisting a driver. Also, navigation units provide guide information about a route to a destination selected by a driver as well as information about places around the destination.

In general, besides providing information related to a destination, the navigation unit may include an audio system and a video system so that a driver may listen to music and even watch video images while driving. In recent years, Audio Video Navigation (AVN), which is integrally formed with the audio system, the video system and the navigation unit, is installed in vehicles.

Besides functions, as mentioned above, various functions may be applied to the vehicle for driver convenience. However, a driver who is not familiar in advance or elderly drivers may have difficulties using various functions due to lack of information about newly updated functions. In addition, although the driver may understand newly updated functions, the driver may fail to use the functions because of difficulties in finding the right time to utilize the functions.

SUMMARY

In view of the above, it is an aspect of the present disclosure to provide a vehicle with a navigation unit that provides guidance regarding a related function which is appropriate for a driving pattern of a driver and a condition of the vehicle. Further, methods for controlling such a vehicle and navigation unit are also disclosed. Additional aspects of the present disclosure will be set forth in part in the description which follows and, in part, will be obvious from the description, or may be learned by practice of the subject technology.

In accordance with one aspect of the present disclosure, a vehicle includes a display unit for displaying information related to a vehicle, and a navigation unit for detecting whether a menu related function needed to be displayed on the display unit by analyzing a condition of the vehicle and a driving pattern, then outputting the menu related function through the display unit when the menu related function is present.

The navigation unit may detect whether the menu related function is present when a same condition of the vehicle and a same driving pattern is maintained during a predetermined period of time. The navigation unit may detect whether the number of notifications of the menu related function exceeds a predetermined number before displaying the menu related function on the display unit, and may display the menu related function when the number of notifications of the menu related function is less than the predetermined number. The navigation unit may further include an input unit provided in a touch type or a separated button and may perform the menu related function when receiving an operation request of the menu related function displayed on the display unit through the input unit selected by users.

The vehicle may further include a vehicle controller configured to transmit a control command to a service device operating the related function when receiving an operation request of the menu related function transmitted from the navigation unit. A plurality of such service devices are preferably mounted inside the vehicle. The navigation unit may display a wiper auto setting menu explaining a wiper auto setting method on the display unit when the condition of the vehicle and the driving pattern indicates that a wiper is being repeatedly operated.

The navigation unit may transmit an operation request to the vehicle controller when the operation request of the wiper auto setting menu is input by users. The navigation unit may display a cruise control setting menu explaining a cruise control setting method on the display unit when the condition of the vehicle and the driving pattern is that the vehicle maintained in a cruise control pattern. The navigation unit may transmit an operation request to the vehicle controller when the operation request of the cruise control setting menu is input by users.

In accordance with one aspect of the present disclosure, a method of controlling a vehicle includes detecting a condition of a vehicle and a driving pattern occurring in real time, detecting whether a menu related function is present by analyzing the condition of the vehicle and the driving pattern, and displaying the menu related function when the menu related function is present.

The control method may further include: detecting whether a same condition of the vehicle and a same driving pattern is maintained during a predetermined period of time between the detecting of the condition of the vehicle and the driving pattern; and the detecting whether the menu related function is present, wherein the vehicle may perform detecting whether the menu related function is present when the same condition of the vehicle and the same driving pattern is maintained during the predetermined period of time.

The displaying of the menu related function may include detecting whether the number of notifications of the menu related function exceeds a predetermined number when the matched menu related function is present, and displaying the menu related function on the display unit when the number of notifications of the menu related function is less than the predetermined number.

The control method may further include, after displaying the menu related function, receiving an operation request of the menu related function displayed on the display unit by the selection of users, and operating the requested menu related function. The control method may further include displaying a wiper auto setting menu that explains a wiper auto setting method on the display unit at the displaying of the menu related function when the condition of the vehicle and the driving pattern indicates that a wiper is being repeatedly operated.

The control method may further include operating the wiper auto setting when an operation request of the wiper auto setting menu is input by users after the displaying of the menu related function. The control method may further include displaying a cruise control menu that explains the cruise control setting method on the display unit at the displaying of the menu related function when the condition of the vehicle and the driving pattern indicates that the vehicle maintained a cruise control pattern. The control method may further include operating the cruise control setting when an operation request of the cruise control setting menu is input by users after displaying of the menu related function.

In accordance with another aspect of the present disclosure, a vehicle includes a display unit displaying information related to the vehicle, and a vehicle controller detecting whether a menu related function needing to be displayed on the display unit is present by analyzing a condition of the vehicle and a driving pattern and outputting the menu related function through the display unit when the menu related function is present.

The display unit may further include an input unit provided in a touch type or a separated button, and the vehicle controller may perform the menu related function when receiving an operation request of the menu related function that is displayed on the display unit by the input unit selected by users.

In accordance with another aspect of the present disclosure, a navigation unit includes a display unit displaying information related to a vehicle, an input unit inputting certain information, and a navigation controller detecting whether a menu related function needing to be displayed on the display unit is present by analyzing a condition of the vehicle and a driving patter and outputting the menu related function through the display unit when the menu related function is present.

In one embodiment, the input unit may be provided in a touch type or a separated button. The navigation controller may transmit an operation request of the menu related function when receiving the operation request of the menu related function through the input unit selected by users. The navigation controller may detect whether the number of notifications of the menu related function exceeds a predetermined number before displaying of the menu related function on the display unit, and may display the menu related function when the number of notifications of the menu related function is less than the predetermined number.

It should be appreciated that the subject technology can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

These and/or other aspects of the disclosure will become apparent and more readily appreciated from the following description of embodiments, taken in conjunction with the accompanying drawings.

FIGS. 5 to 7 are views illustrating an embodiment of guiding a menu related function.

DETAILED DESCRIPTION

Figure 1:
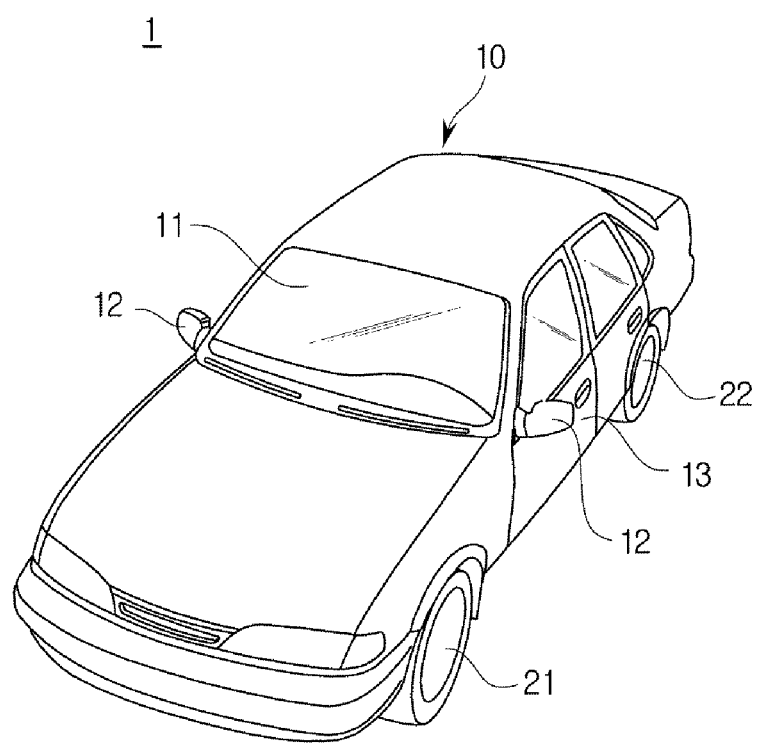
FIG. 1 is a view illustrating an exterior of a vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although an exemplary embodiment is described as using a plurality of units to perform the exemplary process, it is understood that the exemplary processes may also be performed by one or plurality of modules or units that are combined and arranged into fewer or more parts that provide the same functional advantages. Additionally, it is understood that the term controller/control unit refers to a hardware device that includes a memory, a processor and necessary peripheral hardware for operation of the same. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The present disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Like reference numerals in the drawings denote like elements, and thus their description will be omitted. In the description of the present disclosure, if it is determined that a detailed description of commonly-used technologies or structures related to the embodiments of the present disclosure may unnecessarily obscure the subject matter of the invention, the detailed description will be omitted. It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

Figure 2:
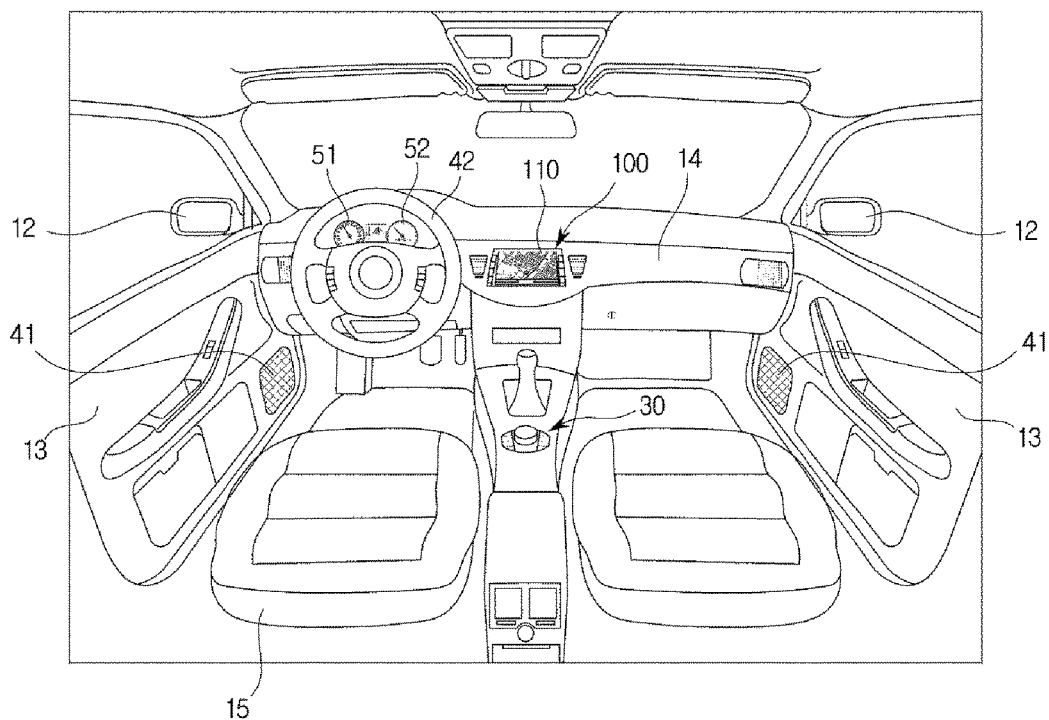
FIG. 2 is a view illustrating an interior of the vehicle.

FIG. 1 is a view illustrating an exterior of a vehicle and FIG. 2 is a view illustrating an interior of the vehicle. Referring to FIG. 1, an exterior of a vehicle 1 may include a body 10 forming an external appearance of the vehicle 1, a windscreen 11 providing a front view and protection for a driver, a side mirror 12 providing a rear view of the vehicle 1 to the driver, doors 13 configured to open and close, and wheels 21, 22. Front wheels 21 are on the front of the vehicle 1 and rear wheels 22 are on the rear of the vehicle 1 to move the vehicle 1.

The windscreen 11 may be disposed on an upper portion of the front side of the body 10 so that the driver inside the vehicle may attain and review visual information in the front of the vehicle 1. In addition, the side mirror 12 may include a right side mirror provided on a right side of the body 10 and a left side mirror provided on a left side of the body 10, and may allow the driver inside the vehicle 1 to attain and review visual information of the side and the rear of the vehicle 1. The doors 13 swing open to allow the driver to access to the interior of the vehicle 1. When the doors 13 are closed, the driver is shielded on the inside of the vehicle 1 from the outside weather conditions.

Referring to FIG. 2, the inside of the vehicle 1 may include a dashboard 14 having various devices to allow the driver to operate the vehicle 1. A driver's seat 15 allows the driver to sit in interior. Cluster display units 51, 52 display operation information of the vehicle 1 and a navigation unit 100 provides route information according to operation commands of the driver. The navigation unit 100 may be an Audio Video Navigation (AVN) configured to provide route information along with an audio system and a video system.

The dashboard 14 may protrude toward the driver from a lower portion of the windscreen 11 so that the driver may easily operate various devices installed in the dashboard 14 while keeping eyes forward. The driver seat 15 is positioned rear of the dashboard 14 so that the driver may drive while being able to review the various apparatus of the dashboard 14 and the forward of the vehicle 1 in a stable posture. The cluster display units 51, 52 may be disposed on the dashboard 14 of the drive seat 15. The cluster display units 51, 52 include a driving speed gauge 51 for displaying the driving speed of the vehicle 1, and a rpm gauge 52 for displaying a speed of revolution of a power system (not shown).

The navigation unit 100 may include a display unit 110 for displaying road information of the road where the vehicle 1 runs and a route to a destination requested by the driver. The navigation unit 100 also has a speaker 41 for outputting sound according to an operation of the driver. In addition, the vehicle 1 may include the power system (not shown) for rotating the wheels 21, 22, a steering apparatus (not shown) for changing a moving direction of the vehicle 1, and a brake apparatus (not shown) for stopping the movement of the wheels 21, 22. The power system may supply torque to the front wheels 21 and/or the rear wheels 22 so that the body 10 may be moved forward or backward. The power system may include a motor generating a torque by burning fossil fuels or utilizing an electrical energy storage device such as a capacitor or battery (not shown).

Figure 3:
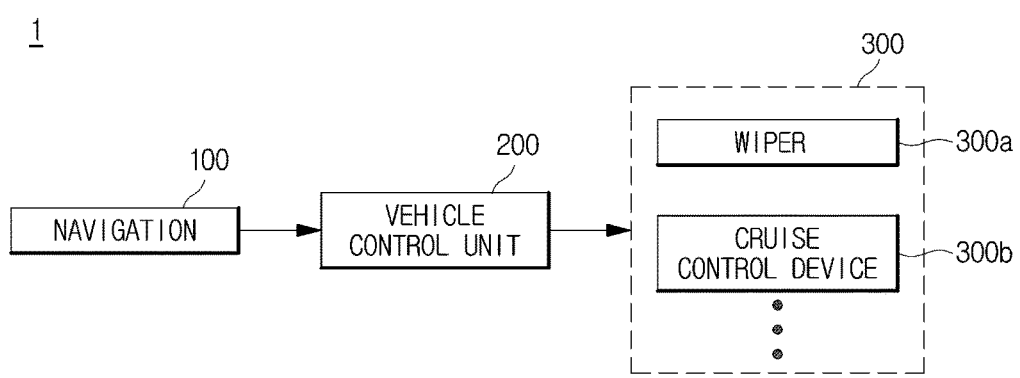
FIG. 3 is a block diagram illustrating a configuration for a controlling of the vehicle according to one embodiment of the present disclosure.

The steering apparatus may include a steering bundle 42 for inputting a driving direction by the driver, a steering gear (not shown) for converting a rotary motion to a altering motion and a steering link (not shown) for delivering the altering motion of the steering gear (not shown) to the front wheel 21. As mentioned above, the steering apparatus may change a driving direction by changing a rotation shaft of the wheel 20. The brake apparatus may include a brake pedal (not shown) for inputting an operation of braking by the driver, a brake drum (not shown) coupled to the wheel 21 and 22, and a brake shoe (not shown) for stopping a rotation of the brake drum (not shown) by using friction force. The brake apparatus stops motion of the vehicle by stopping the rotation of the wheels 21, 22. A navigation unit 100, which will be described, may include an Audio Video Navigation (AVN) device configured to provide a navigation function guiding a route from a departure to a destination as well as an audio system and a video system FIG. 3 is a block diagram illustrating a configuration for a controlling of the vehicle according to one embodiment of the present disclosure. Hereinafter, an embodiment of guiding a menu related function may be described with reference to FIGS. 5 to 7 and another embodiment of guiding a menu related function may be described with reference to FIGS. 8 and 9.

As illustrated in FIG. 3, the vehicle 1 may include a navigation unit 100, a vehicle controller 200, and a service device 300. The navigation unit 100 may detect whether a menu related function needing to be displayed on the display unit 110 is present by analyzing a driving pattern and a condition of the vehicle. The navigation unit 100 can output the menu related function through the display unit 110 of FIG. 4 when the menu related function is present. At this time, the menu related function may be a menu for guiding the function of the vehicle 1 required by the driver that is appropriate for the driving pattern and the current condition of the vehicle 1. Also, the condition of the vehicle 1 and the driving pattern may be operation information of the service device 300 or the driving pattern such as controlling a vehicle speed by a driver, and may be measured by various sensors (not shown) provided inside the vehicle 1.

Figure 5:
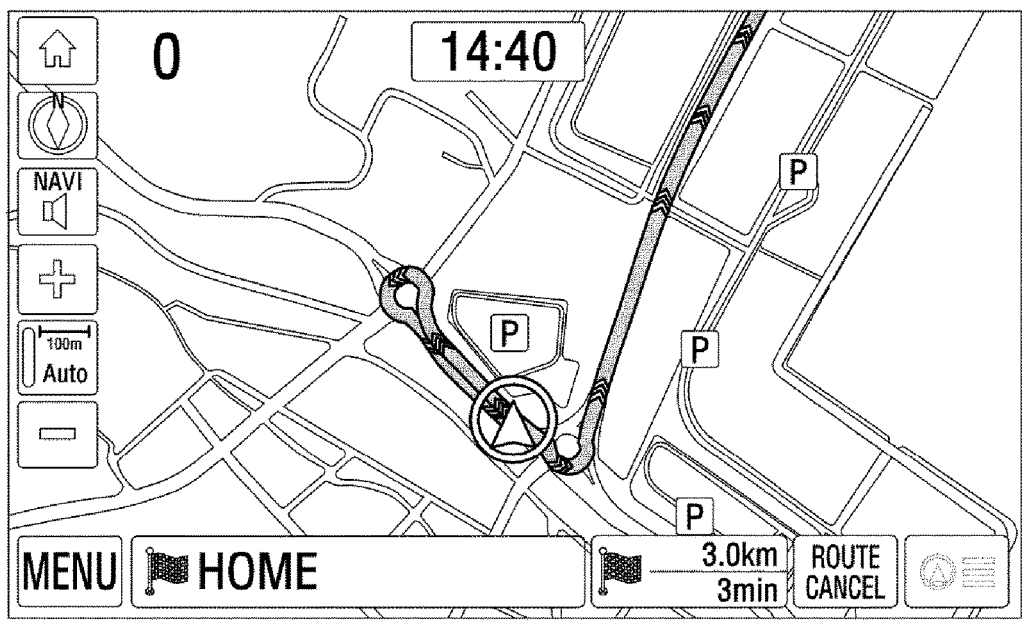

For example, when the condition of the vehicle and the driving pattern indicates that a wiper is being repeatedly operated, the navigation unit 100 may provide a wiper auto setting menu explaining a wiper auto setting method. For example, as shown in FIG. 6, when a wiper is operated downward, such as ①, an auto setting guidance image with guide messages pops up. The guide message could be visual or auditory such as 'You can automatically adjust the speed of the wiper according to the amount of rain. Do you want to set to Auto?' Icons are provided on the display unit 110 to accept (Yes) or reject (No) the function. The display unit 110 also displays route guidance, runs an audio, and/or runs a video as illustrated in FIG. 5. The size and location of the pop up window of the menu related function are not limited to the size and location shown in FIG. 6. In addition, the size and the location be customized according to particular users.

Figure 8:
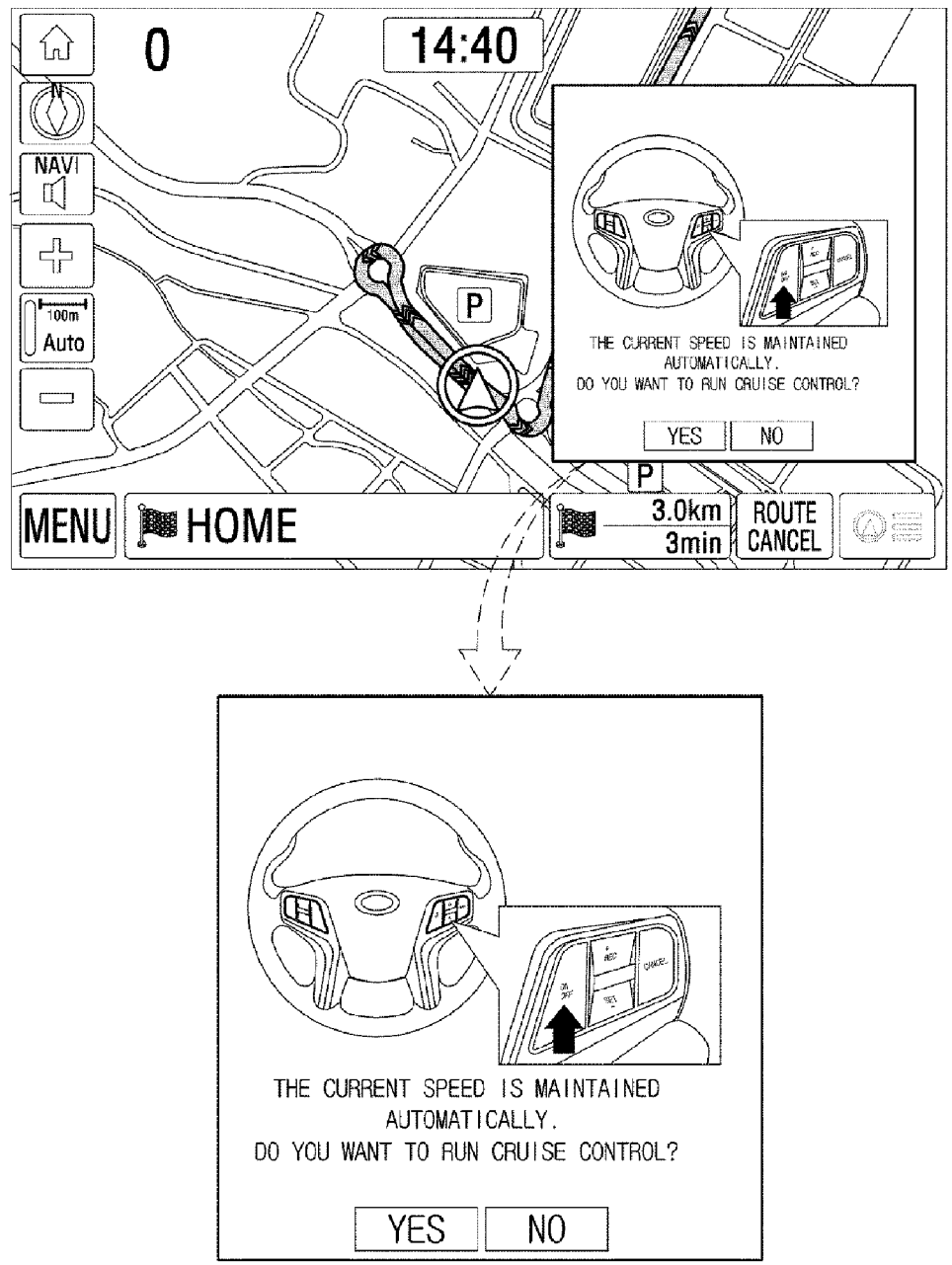
FIGS. 8 and 9 are views illustrating another embodiment of guiding a menu related function.

In addition, as illustrated in FIG. 8, when a condition of the vehicle and a driving pattern indicates that the vehicle moving in a constant speed driving pattern, e.g. the vehicle is moved with keeping a speed of about 80 km/h, the navigation unit 100 may display a cruise control menu explaining a cruise control setting method. For example, a guide image is provided on the display unit 110 indicating a button on the steering wheel for adjusting the cruise control setting. On the display unit 110, the guide message may be 'The current speed is maintained automatically. Do you want to run the cruise control?' and icons to accept (Yes) or reject (No) the function are also provided. A size and a location of the menu related function may be vary by user.

Figure 4:
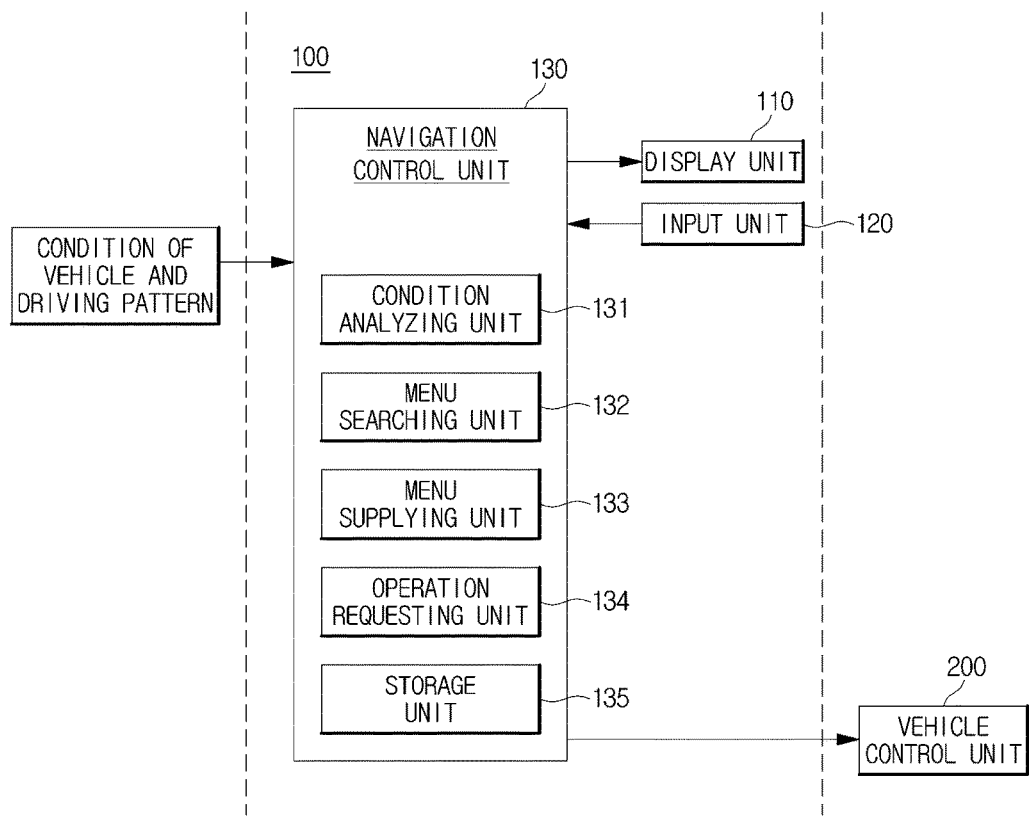
FIG. 4 is a block diagram illustrating a navigation unit of FIG. 3 in detail.

Referring now to FIG. 4, a schematic diagram of the navigation unit 100 is shown. The navigation unit 100 may include an input unit 120 provided in a touch type or a separate button. When receiving an operation request selected by the user from the input unit 120, the navigation unit 100 transmits the operation request of the menu related function to the controller 200 of the vehicle 1 to perform the menu related function.

Figure 7:
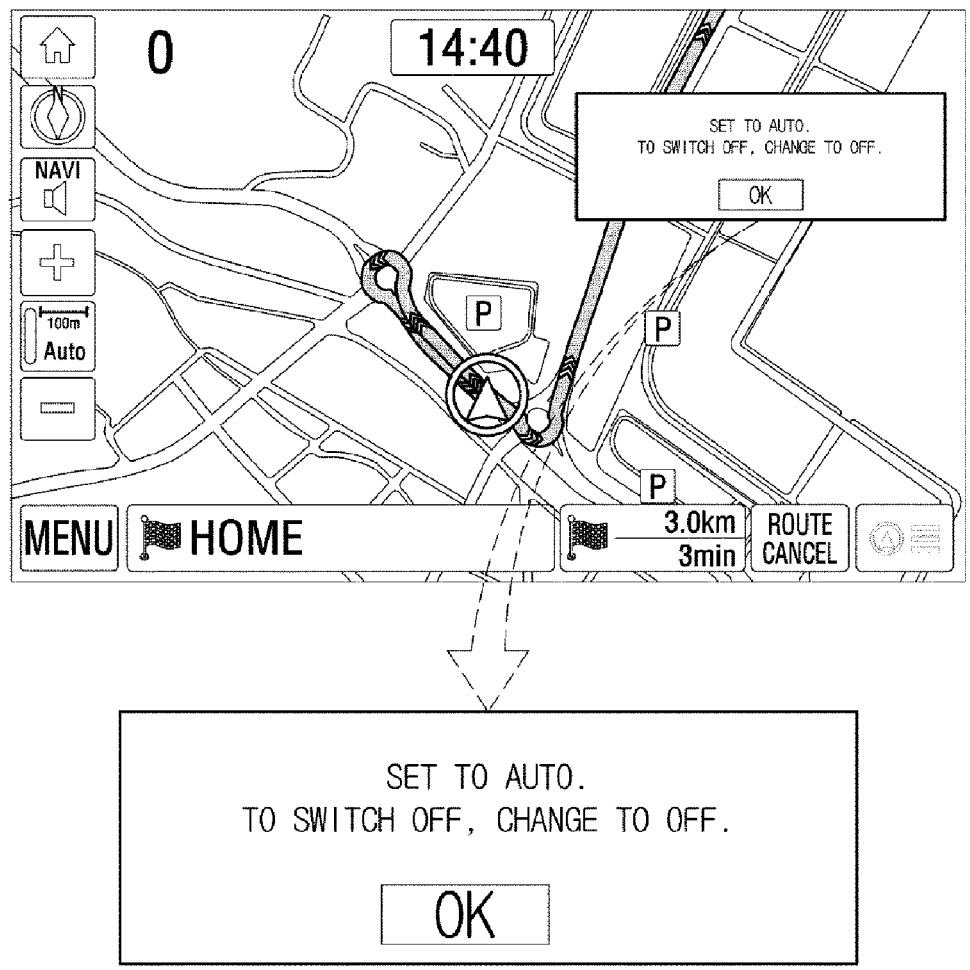
Figure 9:
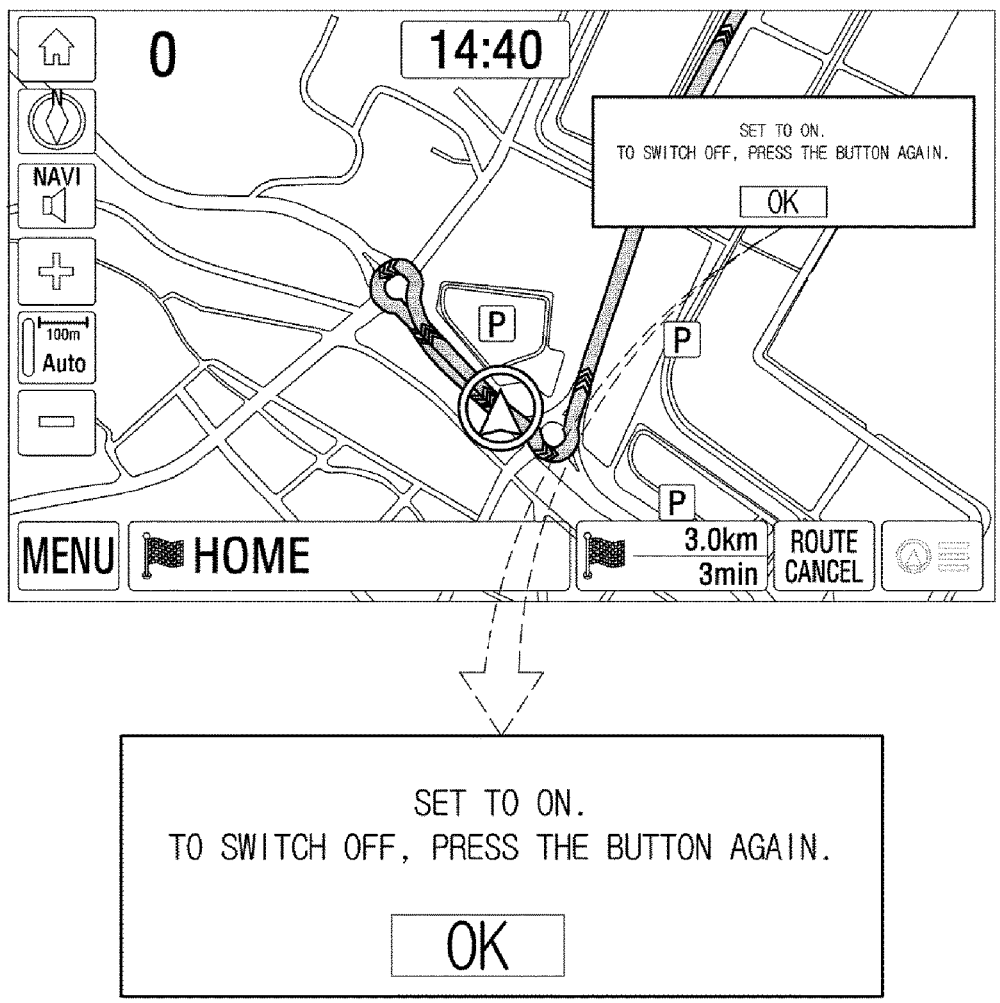

For example, when an operation request of the wiper auto setting menu is input, the navigation unit 100 may transmit the operation request to the controller 200 of the vehicle 1. This may be performed in the same manner even when the operation request of the cruise control menu is input by users. When the wiper auto setting is completed, the navigation unit 100 may display messages, such as 'set to AUTO. To switch off, change to OFF' to indicate that the operation request of the user is complete and allow for easy modification as illustrated in FIG. 7. On the other hand, when the cruise control setting is completed, the navigation unit 100 may display messages, such as 'set to ON. To switch off, press the button again' as illustrated in FIG. 9.

In addition, the navigation unit 100 may detect whether a menu related function is present when a same condition of the vehicle and a same driving pattern is maintained during a predetermined period of time. That is, the navigation unit 100 may provide a menu related function when the menu related function is needed since the same condition and driving pattern continuously occur. Before displaying the menu related function on the display unit the navigation unit 100 may detect whether a number of notifications of the menu related function exceeds a threshold. Preferably, the navigation unit 100 may display the menu related function only when the number of notifications is less than a predetermined number. That is, the navigation unit 100 may inform the menu related function to the user but unnecessarily repetitive notice of the menu related function may be limited so that user convenience may be improved.

The controller 200 may be configured to control a plurality of the service device 300 installed inside the vehicle 1. When the controller 200 receives an operation request from the navigation unit 100, the controller 200 may transmit a control command to the service device 300 configured to operate the related function. The service device 300 may include all devices, such as, a wiper 300a and a cruise control device 300b (see FIG. 3), configured to operate various services of the vehicle 1. The service device 300 is not be limited to the wiper 300a and the erase control device 300b, and may further include a blind spot warning system, a lane departure warning system, a tire pressure monitoring system, and the like. At this time, the cruise control device 300b may mean an electronic cruise control device and may mean a device configured to allow the vehicle to allow the driver to drive at a desired speed without applying pressure to an accelerator pedal.

In addition, the blind spot warning system (not shown) may represent a device configured to prevent a crash accident by detecting and warning the driver about vehicles approaching at high speed from the rear or a blind spot through blind spot detection sensors mounted on the vehicle 1. The lane departure warning system (not shown) may represent a device configured to warn drivers by a warning display as well as a steering wheel vibration by recognizing a lane through a camera when a driver departs from a lane without operating a turn signal. The tire pressure monitoring system (not shown) may represent a device configured to prevent an accident caused by lack of tire pressure by warning through a cluster when pressure of at least one of tires is lower than a predetermined level.

FIG. 4 is a block diagram illustrating a navigation unit of FIG. 3 in detail. As illustrated in FIG. 4, the navigation unit 100 may include a display unit 110, an input unit 120, and a navigation controller 130. The display unit 110 may display information related to the vehicle. The input unit 120 may receive certain information. At this time, the input unit 120 may be provided in a touch type or a separate button. For example, the display unit 110 may include a touch input function so that an operation request of the menu related function is input by selecting a touch button or by selecting a separate button realized on the display unit 110. The navigation controller 130 may detect whether a menu related function needing to be displayed on the display unit 110 is present by analyzing a condition of the vehicle 1 and a driving pattern. The navigation controller 130 may then output the menu related function when the menu related function is present.

As illustrated in FIG. 4, the navigation controller 130 may include a condition analyzing unit 131, a menu searching unit 132, a menu supplying unit 133, an operation requesting unit 134 and a storage unit 135. The condition analyzing unit 131 may detect whether a menu related function is present when a same condition and a same driving pattern of a vehicle is maintained during a predetermined period of time. The menu searching unit 132 may detect whether a menu related function is present based on the condition of the vehicle and driving pattern, and may extract a matched menu related function from the storage 135. The menu supplying unit 133 may output the matched menu related function on the display unit 110, wherein the matched menu related function matches the condition of the vehicle and the driving pattern, and is extracted by the menu searching unit 132.

In addition, before displaying the menu related function, the menu supplying unit 133 may detect whether the number of notifications of the menu related function is exceeded, and then only when the number of the notification is less than a predetermined the number, the menu supplying unit 133 may display the menu related function. As a result, users are prevented from feeling uncomfortable and route guidance is not interrupted due to unnecessarily repetitive notice of the menu related function displayed on the display unit 110. The operation requesting unit 134 may transmit the menu related function to the controller 200 when receiving the operation request of the menu related function through the input unit 110 selected by users. The storage unit 135 may store the menu related function and all information related to the navigation unit 100.

Figure 10:
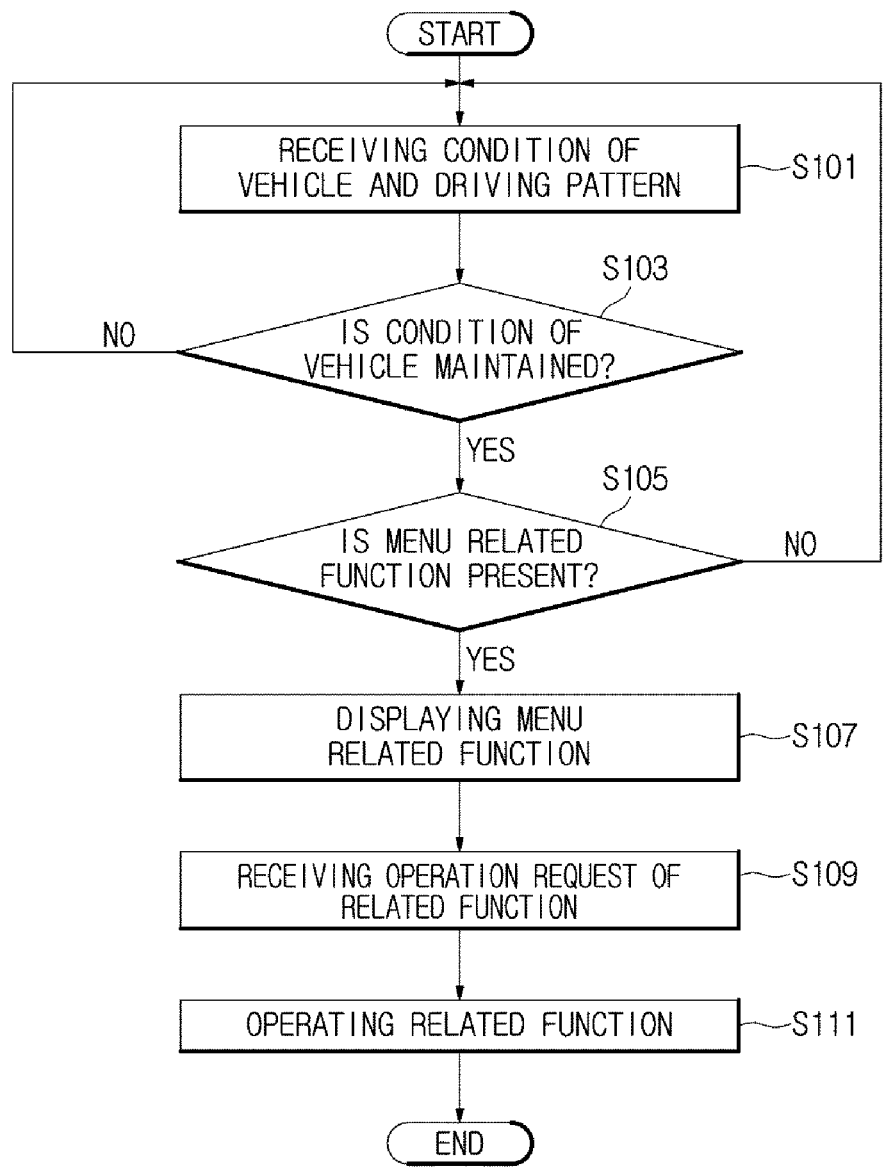
FIG. 10 is a flow chart illustrating a control method of a vehicle according to one embodiment of the present disclosure.

FIG. 10 is a flow chart illustrating a control method of a vehicle 1 according to one embodiment of the present disclosure. At step S101, the vehicle 1 may detect a condition of a vehicle 1 and a driving pattern which occur in real time. At this time, the condition and the driving pattern may include operational information of the service device 300 inside the vehicle 1 or the driving pattern, such as, controlling a speed by a driver, and may be detected by various sensors (not shown) provided inside the vehicle 1.

Next at step S103, the vehicle 1 may determine whether a same condition of the vehicle 1 and a same driving pattern is maintained during a predetermined period of time. That is because prior to searching the menu related function, the vehicle 1 may detect whether the menu related function is needed caused by continuously occurring the same condition of the vehicle 1 and the same driving pattern (e.g., a steady-state condition). If there is not a steady-state condition, the method loops back to step S101.

However, when the same condition of the vehicle 1 and the same driving pattern is maintained during a predetermined period of time, the method proceeds to step S105. At step S105, the vehicle 1 may detect whether the menu related function is present by analyzing the condition of the vehicle 1 and the driving pattern S105. In another embodiment, step S103 may be omitted, and step S105 may be performed after S 101 when S 103 is omitted.

Still at step S105, if the menu related function is not present or needed, the method again loops back to step S101 to restart the process. However, when the matched menu related function is present, the method proceeds to step S107. At step S107, the vehicle 1 displays the menu related function on the display unit 110 for review by the driver. At this time, for example, the condition of the vehicle 1 and the driving pattern is that of a wiper being repeatedly operated. Hence, the vehicle 1 may display a wiper auto setting menu indicating a wiper auto setting method on the display unit 110.

In particular, when the condition of the vehicle 1 and the driving pattern indicates that a wiper is being repeatedly operated, the vehicle 1 may allow a wiper auto setting menu explaining a wiper auto setting method. For example, when a wiper is operated downward, such as ① in FIG. 5, an auto setting guidance image, guide messages, such as 'You can automatically adjust the speed of the wiper according to the amount of rain. Do you want to set to Auto?' and icons to accept (Yes) or reject (No) the function, to pop up on the display unit 110. The display unit 110 may also be displaying route guidance or running an audio and running a video as illustrated in FIG. 5.

When the condition of the vehicle 1 and the driving pattern indicates that the vehicle 1 maintained in a cruise driving pattern, the vehicle 1 may display a cruise control menu indicating a cruise control setting method on the display unit 110. For example, as illustrated in FIG. 8, when a condition of the vehicle 1 and a driving pattern is a constant speed driving pattern (e.g. the vehicle is moved with keeping a speed of about 80 km/h), the vehicle 1 may display a cruise control menu explaining a cruise control setting method. For example, the display unit 110 presents a guide image indicating a button among buttons installed on steering wheel for cruise control setting on the display unit 110, a guide message, such as 'The current speed is maintained automatically. Do you want to run the cruise control?' and icons to accept (Yes) or reject (No) the function.

Still referring to FIG. 10, next at step S109, the vehicle 1 may receive an operation request of the menu related function displayed on the display unit 110 as a result of selection of the user. The navigation unit 100 preferably includes the input unit 120 of FIG. 4. When an operation request of the menu related function displaying on the display unit 110 is received when the input unit 120 is selected by the user, the navigation unit 100 may transmit the operation request of the menu related function to the controller 200 of the vehicle to perform the menu related function. When the vehicle 1 includes only the display unit 110 and not the navigation unit 100, the input unit 120 may be provided in the display unit 110 and the controller 200 may display the menu related function on the display unit 110 and receive an operation request by the selection of the user.

Next at step the vehicle 1 may operate the requested related function and may display a result of the operation. For example, when an operation request of the wiper auto setting menu is inputted, the vehicle 1 may operate the wiper auto setting and display messages, such as "set to AUTO. To switch off, change to OFF" to indicate that the operation request of the user is reflected, as illustrated in FIG. 7. When an operation request of the cruise control menu is inputted by the user, the vehicle 1 may operate the cruise control setting and display messages, such as "set to ON. To switch off, press the button again", as illustrated FIG. 9. After step S111, the method of FIG. 100 ends.

Figure 11:
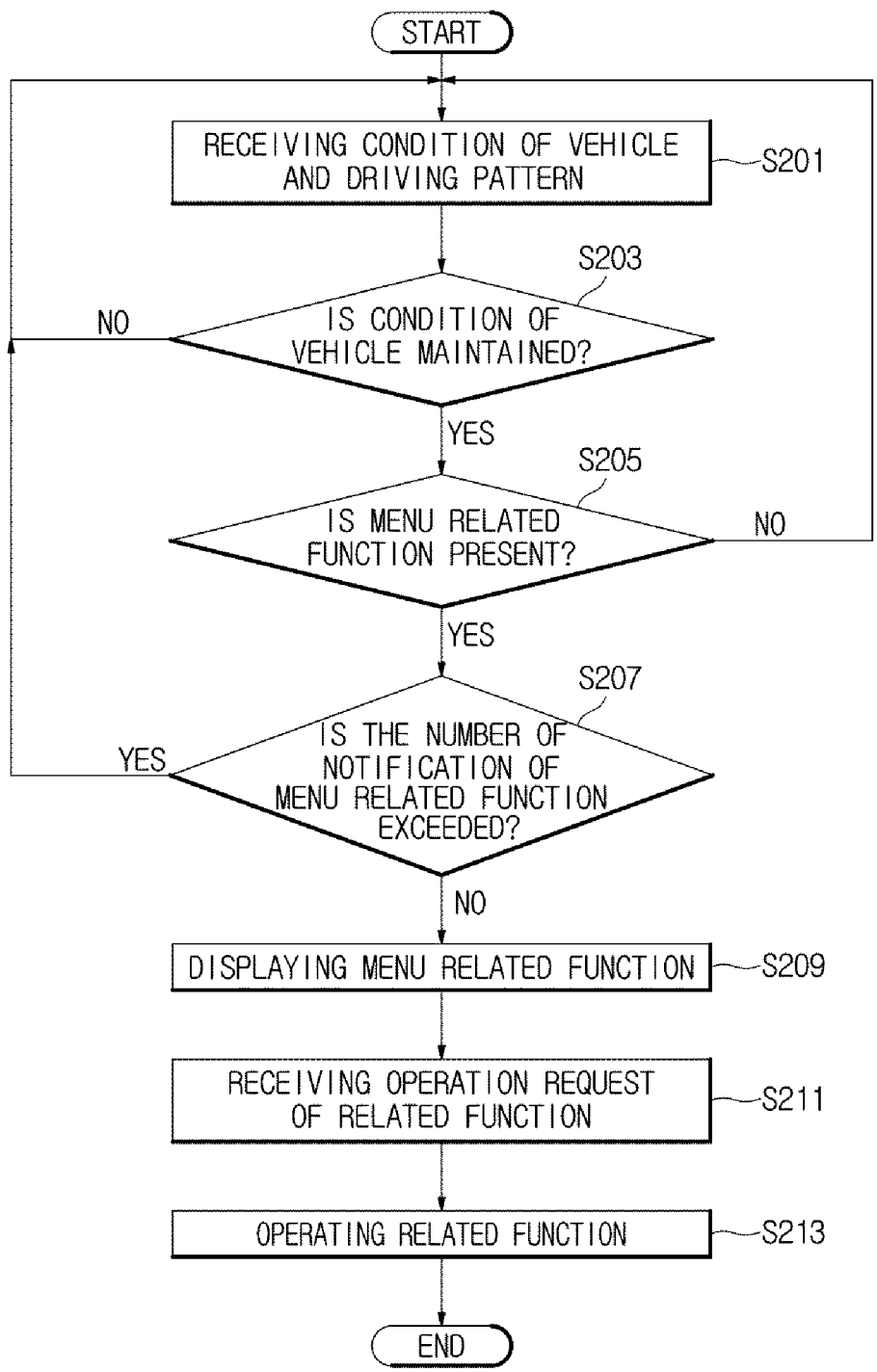
FIG. 11 is a flow chart illustrating a control method of a vehicle according to another embodiment of the present disclosure.

Referring to FIG. 11, a flow chart illustrating a control method of a vehicle according to another embodiment of the present disclosure is shown. Hereinafter, a description of the same parts as those shown in FIG. 10 will be omitted. At step S201, a vehicle 1 may detect a condition of a vehicle 1 and a driving pattern which occurs in real time. Next at step S203, the vehicle 1 determines whether a same condition of the vehicle 1 and a same driving pattern is maintained during a predetermined period of time. If so, the method proceeds to step S205.

Next at step S205, when the same condition of the vehicle 1 and the same driving pattern is maintained during the predetermined period of time, the vehicle 1 may detect whether the menu related function is present by analyzing the condition of the vehicle 1 and the driving pattern. Step S203 may be omitted, and step S205 may be performed after step S201 when step S203 is omitted. When the menu related function is present, the vehicle 1 may display the menu related function on the display unit 110.

When the matched menu related function is present, the method proceeds to step S207. At step S207, the displaying of the menu related function may include displaying the menu related function on the display unit 110 when the number of notification of the menu related function is less than a predetermined number. If the number of notifications of the menu related function exceeds the predetermined number, nothing is displayed and the method loops back to step S201 to periodically repeat the process. If the number of notifications of the menu related function does not exceed the predetermined number, the process proceeds to step S209. At step S209, the menu related function is displayed and the method proceeds to step S211.

At step 211, the vehicle 1 may receive an operation request of the menu related function displayed on the display unit 110 according to the selection of the user. Next at step S213, the vehicle 1 may operate the requested menu related function and display a result of the operation. After step S213, the process ends.

Figure 12:
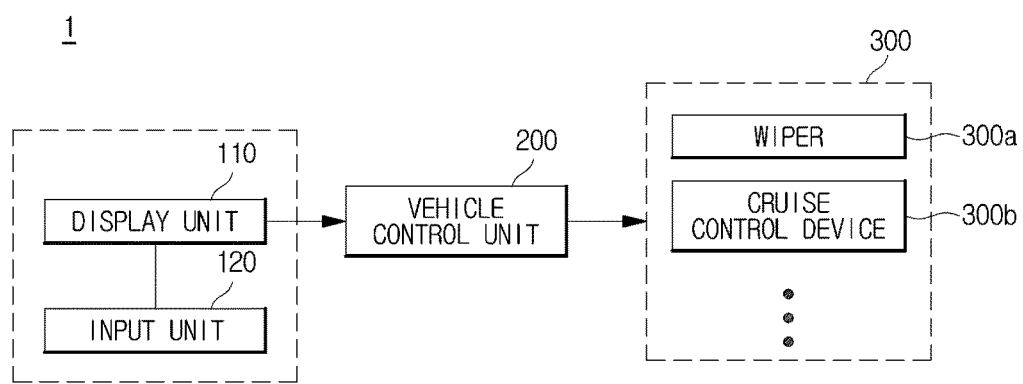
FIG. 12 is a block diagram illustrating a configuration for a controlling of the vehicle according to another embodiment of the present disclosure.

FIG. 12 is a block diagram illustrating a configuration for controlling a vehicle according to another embodiment of the present disclosure, and will be described with a vehicle provided with a display unit 110 but without a navigation function. Hereinafter, a description of the same parts as those shown in FIGS. 3 and 4 will be omitted. As illustrated in FIG. 12, a vehicle 1 may include a display unit 110 displaying information related to the vehicle 1, and a controller 200 detecting whether a menu related function needing to be displayed on the display unit 110 is present by analyzing a condition of the vehicle 1 and a driving pattern. When the menu related function is present, the menu related function is output. The display unit 110 may further include an input unit 120 provided in a touch type or a separate button.

When receiving an operation request of the menu related function displayed on the display unit 110 through the input unit 120 selected by the user, the controller 200 may perform the menu related function. At this time, the controller 200 may transmit a control command for requesting an operation of the function to the service device 300, such as, a wiper 300a and/or a cruise control system 300b etc. By displaying a menu related function on a display unit according to a condition of a vehicle and a driving pattern, accessibility of drivers to various functions of the vehicle may be improved. Users may operate an operation request of the menu related function on the display unit, wherein the menu is a situational menu related function displayed intuitionally through the display unit. Therefore, user convenience may be improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle, comprising:
   a display unit displaying information related to the vehicle; and
   a navigation unit including: a memory configured to store program instructions; and a processor configured to execute the program instructions, the program instructions when executed configured to:
      detect whether a menu related function needed to be displayed on the display unit is present by analyzing a condition of the vehicle and a driving pattern; and
      output the menu related function in the form of a pop-up window on the display unit when the menu related function is present,
   wherein the outputted menu related function includes one or more of a guide image, a guide message, and an icon for accepting or rejecting the menu related function.

2. The vehicle of claim 1, wherein the navigation unit detects whether the menu related function is present when a same condition of the vehicle and a same driving pattern is maintained during a predetermined period of time.

3. The vehicle of claim 1, wherein the navigation unit detects whether a number of notifications of the menu related function and determines if the number exceeds a predetermined threshold number before displaying the menu related function on the display unit, and displays the menu related function when the number of notification of the menu related function is less than the predetermined threshold number.

4. The vehicle of claim 1 wherein the navigation unit further comprises an input unit provided in a touch type or a separate button as well as controls to perform the menu related function when receiving an operation request of the menu related function displayed on the display unit by the input unit as selected by a user.

5. The vehicle of claim 4 further comprising:
   a vehicle controller configured to transmit a control command to a service device operating the related function when receiving an operation request of the menu related function transmitted from the navigation unit; and
   a plurality of service devices mounted inside the vehicle.

6. The vehicle of claim 5 wherein the navigation unit displays a wiper auto setting menu explaining a wiper auto setting method on the display unit when the condition of the vehicle and the driving pattern indicates that a wiper is being repeatedly operated.

7. The vehicle of claim 6 wherein the navigation unit transmits an operation request to the vehicle controller when the operation request of the wiper auto setting menu is input by a user.

8. The vehicle of claim 5 wherein the navigation unit displays a cruise control setting menu explaining a cruise control setting method on the display unit when the condition of the vehicle and the driving pattern indicates that the vehicle is maintaining a cruise driving pattern.

9. The vehicle of claim 8 wherein the navigation unit transmits an operation request to the vehicle controller when the operation request of the cruise control setting menu is input by a user.

10. A control method for a vehicle comprising the steps of:
    detecting a condition of a vehicle and a driving pattern occurring in real time;
    detecting whether a menu related function needed to be displayed on a display unit is present by analyzing the condition of the vehicle and the driving pattern; and
    displaying the menu related function in the form of a pop-up window on the display unit when the menu related function is useful,
    wherein the outputted menu related function includes one or more of a guide image, a guide message, and an icon for accepting or rejecting the menu related function.

11. The method of claim 10, further comprising the step of:
    detecting whether a same condition of the vehicle and a same driving pattern is maintained during a predetermined period of time between the detecting of the condition of the vehicle and the driving pattern and the detecting whether the menu related function is present,
    wherein the vehicle performs detecting whether the menu related function is present when the same condition of the vehicle and the same driving pattern is maintained during the predetermined period of time.

12. The method of claim 10, wherein the displaying of the menu related function includes detecting whether a number of notifications of the menu related function exceeds a predetermined number when the matched menu related function is useful, and displaying the menu related function on the display unit when the number of notifications of the menu related function is less than the predetermined number.

13. The method of claim 10 further comprising:
    after the displaying of the menu related function, receiving an operation request of the menu related function displayed on the display unit by the selection of users; and
    operating the requested menu related function.

14. The method of claim 10, wherein displaying a wiper auto setting menu explaining the wiper auto setting method on the display unit is performed at the displaying of the menu related function when the condition of the vehicle and the driving pattern is state information of the wiper being repeatedly operated.

15. The method of claim 14, further comprising the step of:
  operating the wiper auto setting when an operation request of the wiper auto setting menu is input by a user after the displaying of the menu related function.

16. The method of claim 10, further comprising the step of:
  displaying a cruise control menu explaining the cruise control setting method on the display unit at the displaying of the menu related function when the condition of the vehicle and the driving pattern indicates that the vehicle is maintaining in a cruise control pattern.

17. The method of claim 16, further comprising:
  operating the cruise control setting when an operation request of the cruise control setting menu is input by a user after the displaying of the menu related function.

18. A vehicle, comprising:
  a display unit displaying information related to the vehicle; and
  a vehicle controller detecting whether a menu related function needed to be displayed on the display unit is present by analyzing a condition of the vehicle and a driving pattern and outputting the menu related function in the form of a pop-up window on the display unit when the menu related function is present,
  wherein the outputted menu related function includes one or more of a guide image, a guide message, and an icon for accepting or rejecting the menu related function.

19. The vehicle of claim 18, wherein the display unit further comprises an input unit provided in a touch type or a separate button, and the vehicle controller performs the menu related function when receiving an operation request of the menu related function displayed on the display unit by the input unit selected by a user.

20. A navigation unit comprising:
  a memory configured to store program instructions; and
  a processor configured to execute the program instructions, the program instructions when executed configured to provide:
  a display unit for displaying information related to a vehicle;
  an input unit for inputting certain information; and
  a navigation controller for detecting whether a menu related function needed to be displayed on the display unit is present by analyzing a condition of the vehicle and a driving pattern, and outputting the menu related function in the form of a pop-up window on the display unit when the menu related function is present,
  wherein the outputted menu related function includes one or more of a guide image, a guide message, and an icon for accepting or rejecting the menu related function.

21. The navigation unit of claim 20 wherein the input unit is provided in a touch type or a separate button, and the navigation controller transmits an operation request of the menu related function when receiving the operation request of the menu related function through the input unit selected by a user.

22. The navigation unit of claim 20 wherein the navigation controller detects whether the menu related function is present when a same condition of the vehicle and a same driving pattern is maintained during a predetermined period of time.

23. The navigation unit of claim 20 wherein the navigation controller detects whether a number of notifications of the menu related function exceeds a predetermined number before the displaying of the menu related function on the display unit, and displays the menu related function when the number of notifications is less than the predetermined number.

* * * * *